United States Patent
Griffin et al.

(10) Patent No.: US 9,514,034 B1
(45) Date of Patent: Dec. 6, 2016

(54) ORDERED TEST EXECUTION TO ENABLE FASTER FEEDBACK

(71) Applicant: Amazon Technologies, Inc., Reno, NV (US)

(72) Inventors: David Robert Griffin, Seattle, WA (US); Carlos Alejandro Arguelles, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/570,943

(22) Filed: Dec. 15, 2014

(51) Int. Cl.
*G06F 9/44* (2006.01)
*G06F 11/36* (2006.01)

(52) U.S. Cl.
CPC ................................ *G06F 11/3672* (2013.01)

(58) Field of Classification Search
None
See application file for complete search history.

(56) References Cited

U.S. PATENT DOCUMENTS

| | | | |
|---|---|---|---|
| 6,031,990 A * | 2/2000 | Sivakumar | G06F 11/3664 714/E11.208 |
| 8,458,669 B2 | 6/2013 | Glowaty | |
| 8,745,592 B1 | 6/2014 | Ormandy et al. | |
| 8,850,270 B2 | 9/2014 | Heiper et al. | |
| 8,892,953 B2 | 11/2014 | Frohlich et al. | |
| 8,898,639 B2 | 11/2014 | Lawrance et al. | |

* cited by examiner

*Primary Examiner* — Qamrun Nahar
(74) *Attorney, Agent, or Firm* — Robert C. Kowert; Meyertons, Hood, Kivlin, Kowert & Goetzel, P.C.

(57) ABSTRACT

Methods, systems, and computer-readable media for ordered test execution to enable faster feedback are disclosed. A likelihood of failure is estimated for individual tests in a set of tests. Based at least in part on the likelihood of failure, an ordered sequence is determined for the set of tests, such that the tests are ordered in estimated likelihood of failure. The set of tests is initiated in the ordered sequence, such that one or more computer-executable programs are subjected to individual ones of the tests. A failure of one or more of the tests is determined prior to performing one or more remaining tests in the ordered sequence.

20 Claims, 6 Drawing Sheets

ORDERED TEST EXECUTION TO ENABLE FASTER FEEDBACK

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

Automated testing of such services is an increasingly important part of the software development process. As part of the build process and also as part of the deployment process, a suite of tests may be run to verify the expected operation of the software. However, running an entire suite of tests may take a significant amount of time, e.g., tens of minutes to multiple hours. While the software is being tested, a developer may be forced to stop work on the project for the duration of the entire suite of tests. The time taken to run the suite of tests may also limit the number of feedback cycles for a developer in a given period of time. If a developer continues writing code while a program is being tested, only to find that the tests eventually fail, then the developer may need to spend additional time to undo or modify the recent work to address the issues revealed by the failed tests. Accordingly, in large organizations with thousands of developers, automated testing of software builds may result in developer inefficiency on a large scale.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for ordered test execution to enable faster feedback are described. Using the techniques described herein, individual tests in a suite of tests may be analyzed to estimate the likelihood that the test will fail. The likelihood of failure may be based on a variety of weighted factors such as the failure history of individual tests. The tests may be placed in an ordered sequence based (at least in part) on the estimated likelihood of failure for the individual tests. When the testing process is initiated using the ordered sequence, tests with a higher estimated likelihood of failure may be performed earlier than those with a lower estimated likelihood of failure. When one or more failures are encountered during the testing process, the testing may be stopped before all the tests have been performed, and/or a user may be notified of the failure(s). In this manner, feedback about test failure may be delivered earlier in the testing process so that developers may use their time more efficiently.

Figure 1:
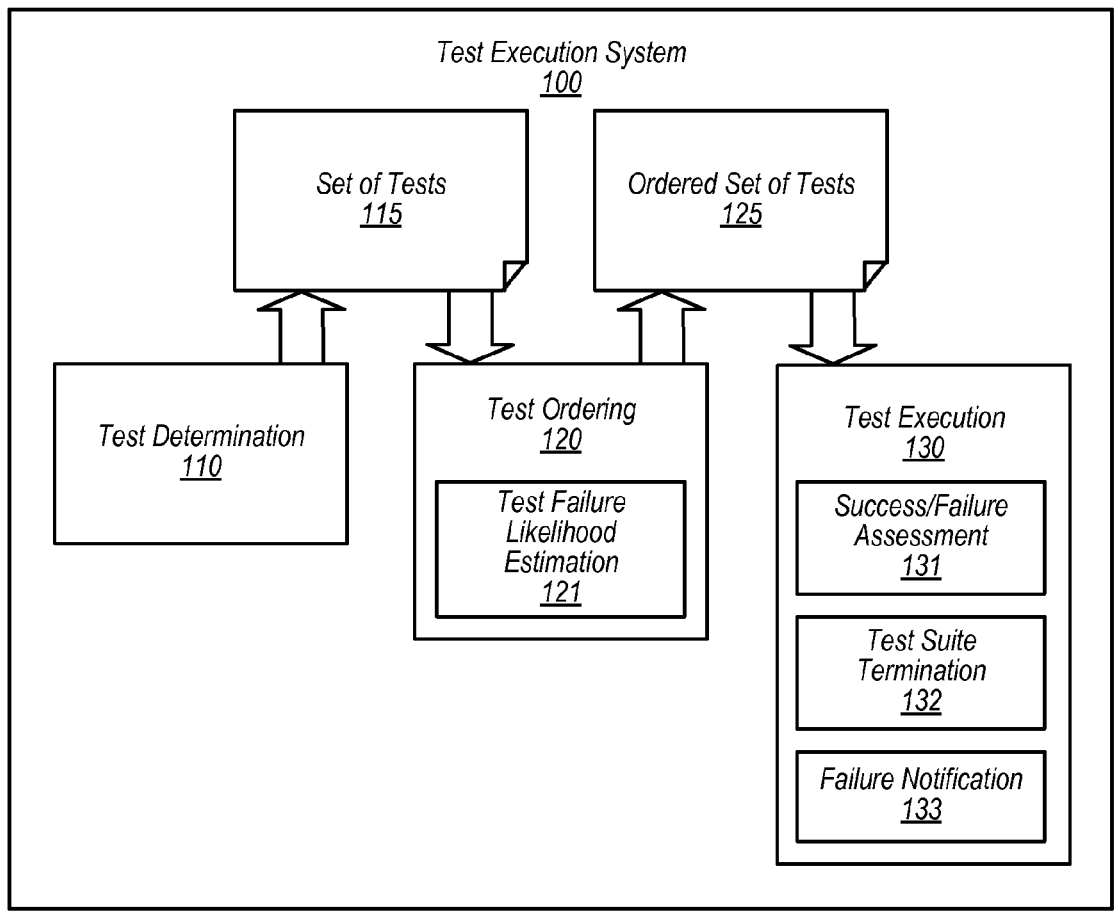
FIG. 1 illustrates an example system environment for ordered test execution to enable faster feedback, according to one embodiment.

FIG. 1 illustrates an example system environment for ordered test execution to enable faster feedback, according to one embodiment. The example system environment may comprise a test execution system 100. The test execution system may include various modules such as a test determination module 110, a test ordering module 120, and a test execution module 130. The test determination module 110, test ordering module 120, and test execution module 130 may be used to test a service or other software product at build time, deployment time, or any other suitable time in the development cycle. The test determination module 110, test ordering module 120, and test execution module 130 may be part of a testing framework that is available to developers of various types of software product. In one embodiment, the test determination module 110, test ordering module 120, and test execution module 130 may be activated as part of a deployment pipeline for deploying a software product to a production environment.

Figure 6:
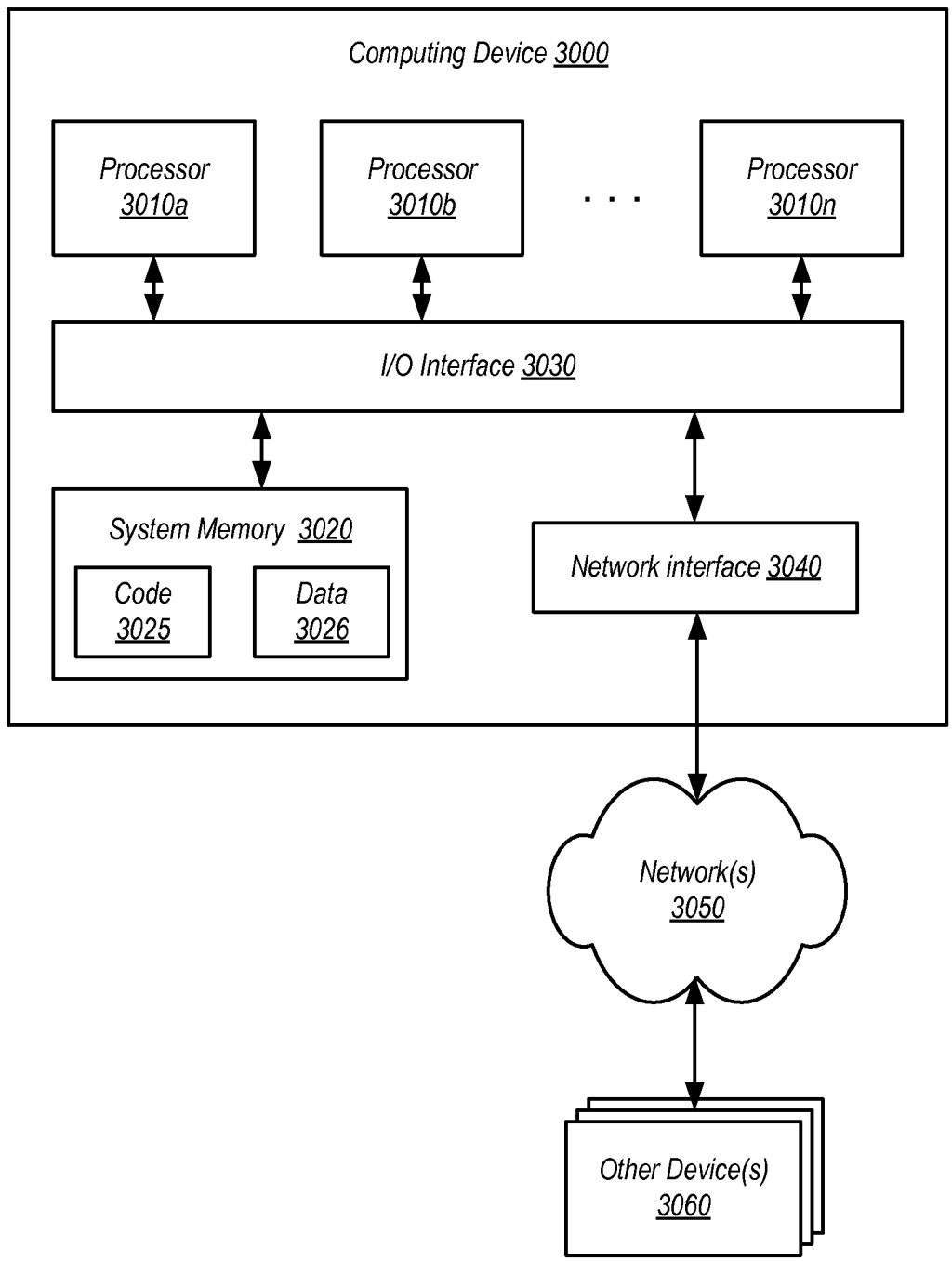
FIG. 6 illustrates an example computing device that may be used in some embodiments.

The test execution system 100 may comprise one or more computing devices, any of which may be implemented by the example computing device 3000 illustrated in FIG. 6. In various embodiments, the functionality of the different modules (e.g., test determination module 110, test ordering module 120, and test execution module 130) may be provided by the same computing device or by different computing devices. If any of the test determination module 110, test ordering module 120, and/or test execution module 130 are implemented using different computing devices, then the modules and their respective computing devices may be communicatively coupled, e.g., via a network. Each of the test determination module 110, test ordering module 120, and test execution module 130 may represent any combination of software and hardware usable to perform their respective functions, as discussed as follows. Operations implemented by the test determination module 110, test ordering module 120, and/or test execution module 130 may be performed automatically, e.g., without a need for user initiation or user intervention after an initial configuration stage, and programmatically, e.g., by execution of program instructions on a computing device.

The test determination module 110 may select or otherwise determine a set of tests 115, also referred to herein as a test suite, to be performed with respect to testing one or more software products. The set of tests 115 may be determined on any suitable basis. In one embodiment, the set of tests 115 may be determined automatically, e.g., without direct user input. In another embodiment, the set of tests 115 may be determined based at least in part on user input. The set of tests 115 may be selected from a larger set of potential tests. Individual tests in the set of tests may be configured with suitable parameters. In general, the set of tests 115 may include performance tests such as sanity tests, latency tests, and/or load tests for scalability and throughput. Each test may be associated with an acceptable range of results, such that results outside the acceptable range may constitute a failure for that particular test. In one embodiment, various heuristics may be applied to determine whether the software product passes or fails a particular test.

The set of tests 115 may initially be unordered or ordered on an arbitrary basis. As will be described in greater detail below, the test ordering module 120 may determine an ordered sequence for the set of tests 115. Accordingly, the test ordering module 120 may generate an ordered set of tests 125 that places the original set of tests 115 in the ordered sequence. In one embodiment, the test ordering module 120 may generate the ordered sequence such that tests that are more likely to fail are located earlier in the sequence than tests that are less likely to fail. The test ordering module 120 may implement a functionality for test failure likelihood estimation 121. Using the functionality for test failure likelihood estimation 121, the test ordering module 120 may assess a likelihood of failure for each test in the set of tests 115, e.g., by scoring each test based on a series of factors. Based at least in part on the estimated likelihoods of failure, at least a portion of the tests 115 may be ordered from most likely to fail to least likely to fail in the ordered set of tests 125.

The test execution module 130 may implement, execute, or otherwise perform at least some of the tests on the software product under test. The test execution module 130 may perform the tests in the order specified in the ordered set of tests 125. In one embodiment, the tests may be executed on a single system such a developer computer system or a suitable test host. In one embodiment, the tests may be executed on a set of computer systems such as a fleet of test hosts. In one embodiment, the tests may be executed in a test environment in which the software product may be insulated from real-time interaction with real-world clients, e.g., by processing only synthetic requests or prerecorded client requests that were previously captured in a production environment. For example, if the software product implements a service that is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc.

The test execution module 130 may implement a functionality for success/failure assessment 131. Using the functionality for success/failure assessment 131, the test execution module 130 may determine whether the service or program passes or fails a particular test. Various performance metrics may be collected in conjunction with the tests to determine the impact of the tests and thus to assess the success or failure of a particular test. For example, the performance metrics may relate to aspects of processor usage, memory usage, disk or storage usage, network usage, and/or the usage of any other measurable resource. The performance metrics may be collected using any suitable techniques, e.g., the instrumentation of various software modules and/or the use of data gathered by an operating system. The performance metrics may be used by various heuristics to determine whether the build passes or fails a particular test. In one embodiment, the heuristics may be predetermined or preconfigured by the developer or development team. The heuristics may also include default heuristics, where appropriate. In one embodiment, a user may specify the percentile metrics to consider for the heuristics (e.g., minimum, maximum, average, p50, p90, p99, etc.). In one embodiment, a user may specify which transactions to consider for the heuristics: e.g., all transactions averaged, any transaction type (e.g., fail if the p90 of any transaction type has increased by 10%), or a specific transaction type (e.g., fail if the p90 of reads has increased). In one embodiment, the heuristics may implement service level agreements (SLAs) for the software product. For example, the performance metrics collected for the tests may indicate the number of transactions processed and the pass/fail ratio. A heuristic may fail the build if the error rate exceeds a predetermined threshold (e.g., 0.1% error rate). Such a heuristic may be applied to one or more specific transaction types or to all transaction types.

The test execution module 130 may implement a functionality for test suite termination 132. Using the functionality for test suite termination 132, the test execution module 130 may terminate further testing for the entire test suite when particular conditions are met. When testing is terminated at a particular point in the ordered sequence, any remaining tests in the ordered sequence may not be performed. The particular conditions under which testing may be terminated may be configurable. In one embodiment, the test suite may be terminated when a single test failure is encountered. In one embodiment, the test suite may be terminated when a particular number of test failures are encountered. In one embodiment, the test suite may be terminated when a particular number or percentage of test failures are encountered, e.g., within a particular period of time. In one embodiment, the test suite may be terminated when one or more particular types of test failures are encountered. In one embodiment, the test suite may be terminated based on dependencies between one or more failed tests and one or more current or upcoming tests; the dependencies may be determined using any suitable techniques, including machine learning techniques. In one embodiment, the test suite may be automatically terminated when the conditions are met. In one embodiment, a user may be notified of one or more test failures and/or if the particular conditions are met, and the test suite may be terminated based on user input following the notification. Because the tests are ordered in decreasing likelihood of failure, the testing process may be configured to end sooner rather than later if failures are encountered. In this manner, the development cycle may be optimized such that less developer time is spent waiting for a test suite to be completed.

The test execution module 130 may implement a functionality for failure notification 133. Using the functionality for failure notification 133, the test execution module 130 may notify a user or other module when one or more failures are encountered during the execution of a test suite. In one embodiment, the functionality for failure notification 133 may be configured to notify the user or other module only when particular conditions are met, such as the conditions discussed above with respect to the functionality for test suite termination 132. As also discussed above, the test suite may be terminated based on user input following the notification.

Figure 2:
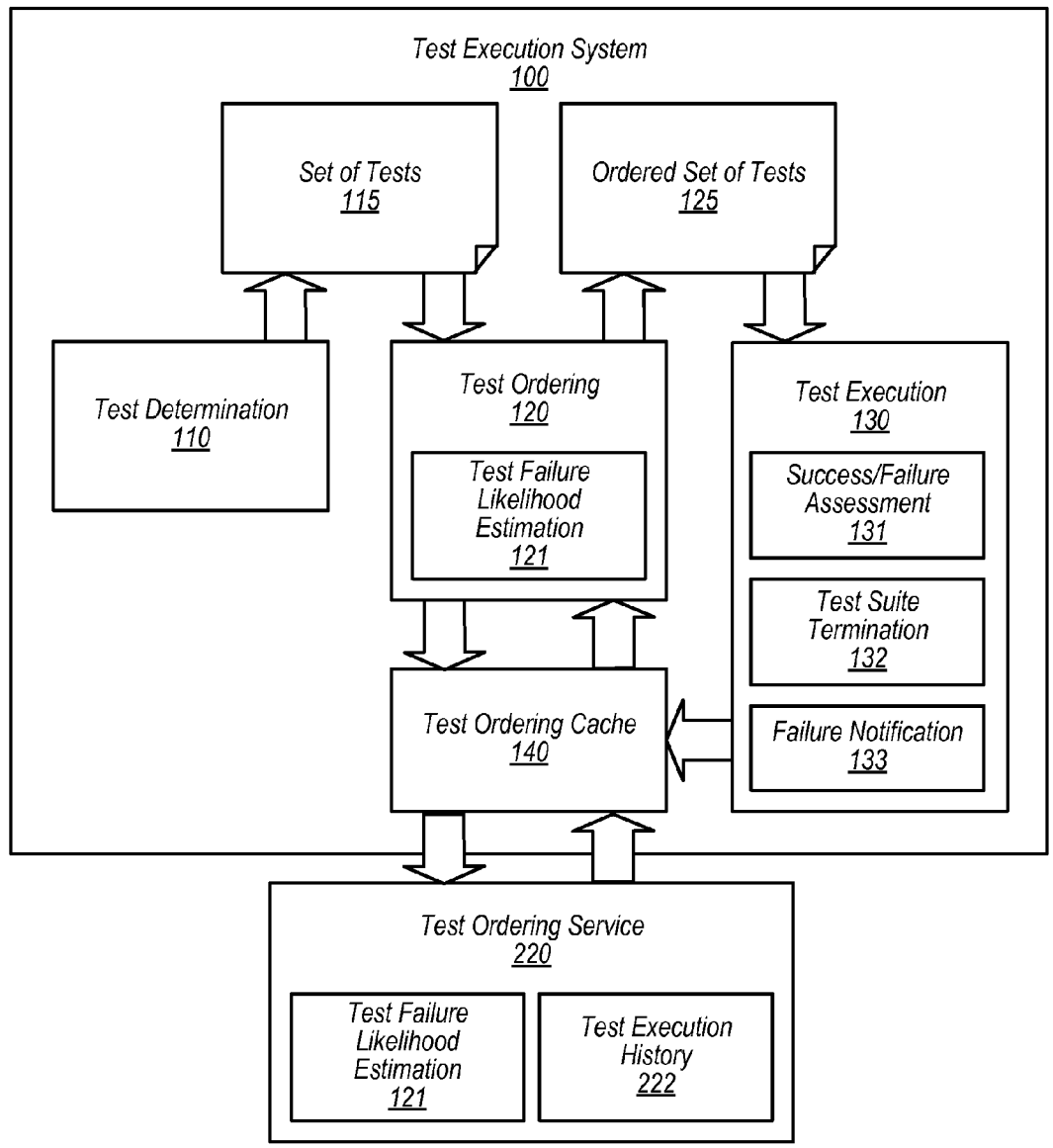
FIG. 2 illustrates further aspects of the example system environment for ordered test execution to enable faster feedback, including a test ordering service, according to one embodiment.

FIG. 2 illustrates further aspects of the example system environment for ordered test execution to enable faster feedback, including a test ordering service, according to one embodiment. In one embodiment, the test execution system 100 may be configured to perform unit tests, e.g., tests in which the test host(s) do not access other systems over a network. In one embodiment, the test execution system 100 may be configured to perform integration tests, e.g., tests in which the test host(s) do access other systems over a network. In either case, the test execution system 100 may be configured to implement the functionality for test failure likelihood estimation 121 to generate the ordered set of tests 125.

When the test host is not isolated from other systems, the test execution system 100 may interact with a test ordering service 220. The test ordering service 220 may be implemented by one or more computing devices, any of which may be implemented by the example computing device 3000 illustrated in FIG. 6. The test ordering service 220 may be external to the test execution system, e.g., implemented using one or more different computing devices and accessible to the test execution system 100 over a network. The test ordering service 220 may implement the functionality for test failure likelihood estimation 121 in a similar manner as discussed above with respect to FIG. 1. However, the test ordering service 220 may use the functionality for test failure likelihood estimation 121 to generate ordered sequences of tests for a plurality of other testing systems in addition to the test execution system 100. The test ordering service 220 may store a test execution history 222 for a plurality of testing systems, including the test execution system 100. The test ordering service 220 may refer to the test execution history 222 in using the functionality for test failure likelihood estimation 121 to generate an ordered sequence of tests.

The test ordering service 220 may present any suitable interface(s) to offer its functionality for test ordering to clients. For example, when the test execution system 100 seeks to generate the ordered set of tests 125, and when the test ordering service is accessible over a network, a suitable module of the test execution system 100 may send a request for test ordering to the test ordering service 220. In one embodiment, the test execution system 100 may also send or otherwise indicate the set of tests 115 to the test ordering service 220. Using the functionality for test failure likelihood estimation 121, the test ordering service may generate the ordered set of tests 125 and return the ordered set of tests 125 or any suitable indication of the ordered sequence to the test execution system 100.

In one embodiment, a test ordering cache 140 may act as an intermediary between the test execution system 100 and the test execution service 220. When the test ordering service 220 returns the ordered set of tests 125 or other indication of the ordered sequence to the test execution system 100, the ordered set of tests 125 or other indication of the ordered sequence may be stored in the test ordering cache 140. The test execution system 100 may then refer to the cached sequence when the test ordering service 220 is not accessible to the test execution system 100. Alternatively, the test ordering module 120 may use its own functionality for test failure likelihood estimation 121 to generate an ordered set of tests 125 when the test ordering service 220 is not accessible to the test execution system 100.

The test execution module 130 may generate test execution results in connection with executing one or more ordered sets of tests. For each test that was attempted, the test execution results may indicate the success or failure of the test, the time at which the test was attempted, an identifier of the test, an identifier of the software product under test, an identifier of the testing environment, an identifier of the computing device(s) used in the test, and/or any other suitable metadata. The test execution system 100 may store the test execution results in a local test execution history, e.g., using the test ordering cache 140 and/or test ordering module 120. The test execution system 100 may also send the test execution results to the test ordering service 220 for aggregation with the global test execution history 222. In one embodiment, the test execution results may be held in the test ordering cache 140 until the test ordering service is accessible to the test execution system 100. In generating the ordered set of tests 125 using the local test ordering module 120, the test execution system 100 may refer to the local test execution history to optimize the order of the tests. Because the test ordering service 220 may use a global test execution history 222 that includes test results from many systems, the test ordering service 220 may generate an ordered sequence of tests that is even further optimized.

Figure 3:
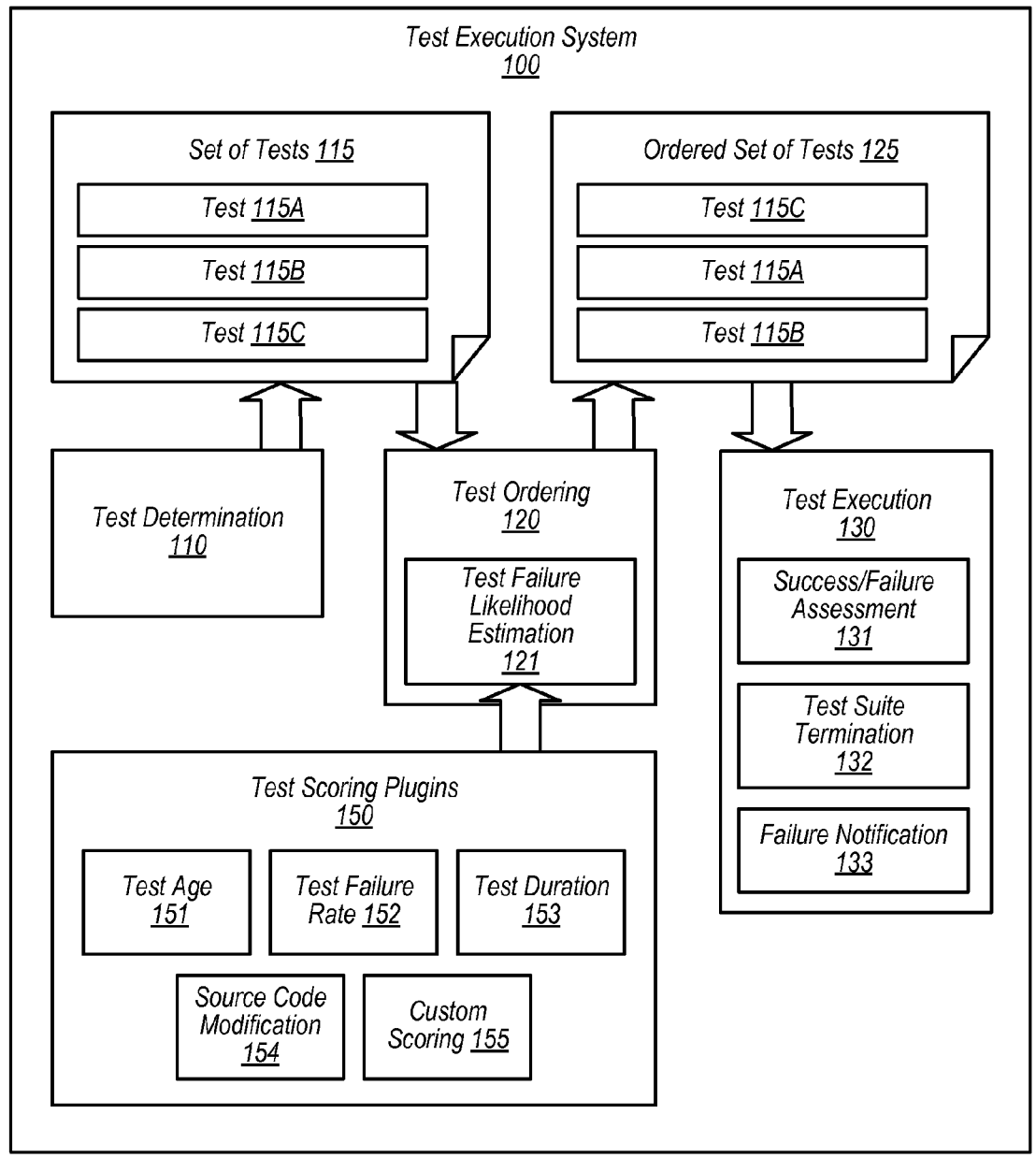
FIG. 3 illustrates further aspects of the example system environment for ordered test execution to enable faster feedback, including test scoring plugins, according to one embodiment.

FIG. 3 illustrates further aspects of the example system environment for ordered test execution to enable faster feedback, including test scoring plugins, according to one embodiment. As shown in the example of FIG. 3, the original set of tests 115 may include a first test 115A, a second test 115B, and a third test 115C. Although three tests 115A-115C are shown for purposes of example, it is contemplated that any suitable number of tests may be used with the test execution system 100. The test ordering functionality 120 may estimate the likelihood of failure for each of the tests 115A-115C, score them according to the estimated likelihood (and potentially other factors), and sort them according to the scores in the ordered set of tests 125. In the example of FIG. 3, the third test 115C may be determined to have the highest likelihood of failure, the first test 115A may be determined to have the next highest likelihood of failure, and the second test 115B may be determined to have the lowest likelihood of failure. Accordingly, the ordered set of tests 125 may represent the tests in an ordered sequence from most likely to fail to least likely to fail.

Each of the tests 115A-115C may be assigned a score based on a set of weighted factors. Each of the factors may represent a heuristic that assesses where the test should be placed in the ordered sequence. The weights may vary from factor to factor in order to optimize the estimated likelihood of failure. The weights may also vary from test suite to test suite. To score each of the tests 115A-115C, the functionality for test failure likelihood estimation 121 may use a plurality of test scoring plugins 150. Each of the plugins may represent one of the weighted factors and may comprise any suitable set of program instructions and data to calculate the corresponding factor. Although the test scoring plugins 150 are shown in connection with the test ordering module 120, the test ordering service 220 may use the test scoring plugins 150 in a similar manner.

In one embodiment, the test scoring plugins 150 may include a test age plugin 151 that scores a test according to its age, e.g., the relative newness of the test. Newer tests may be considered more likely to fail than older tests. In one embodiment, the test scoring plugins 150 may include a test failure rate plugin 152 that scores a test according to its failure rate, e.g., the failures in its portion of the test execution history. The test failure rate may be determined based on the age of the failure such that newer failures have a greater contribution than older failures. The test failure rate may be determined based on a raw number of failures and/or on a percentage of failures over a period of time. In one embodiment, the test failure rate may be determined based on a success/failure correlation with other tests.

In one embodiment, the test scoring plugins 150 may include a test duration plugin 153 that scores a test according to its estimated time to completion. Based on the test duration factor, shorter tests may be placed earlier in the ordered sequence than longer tests in order to enable faster feedback on potential failures. In one embodiment, the test scoring plugins 150 may include a source code modification plugin 154 that scores a test according to the age of any modification to its source code. More recently modified tests may be considered more likely to fail than less recently modified tests. In one embodiment, the source code modification plugin 154 may score a test according to the age of any modification to the source code of the software product under test. Again, more recently modified code may be considered more likely to fail than less recently modified code. Additionally, the test scoring plugins 150 may include one or more custom scoring plugins 155 for additional adjustment of the scores.

Figure 4:
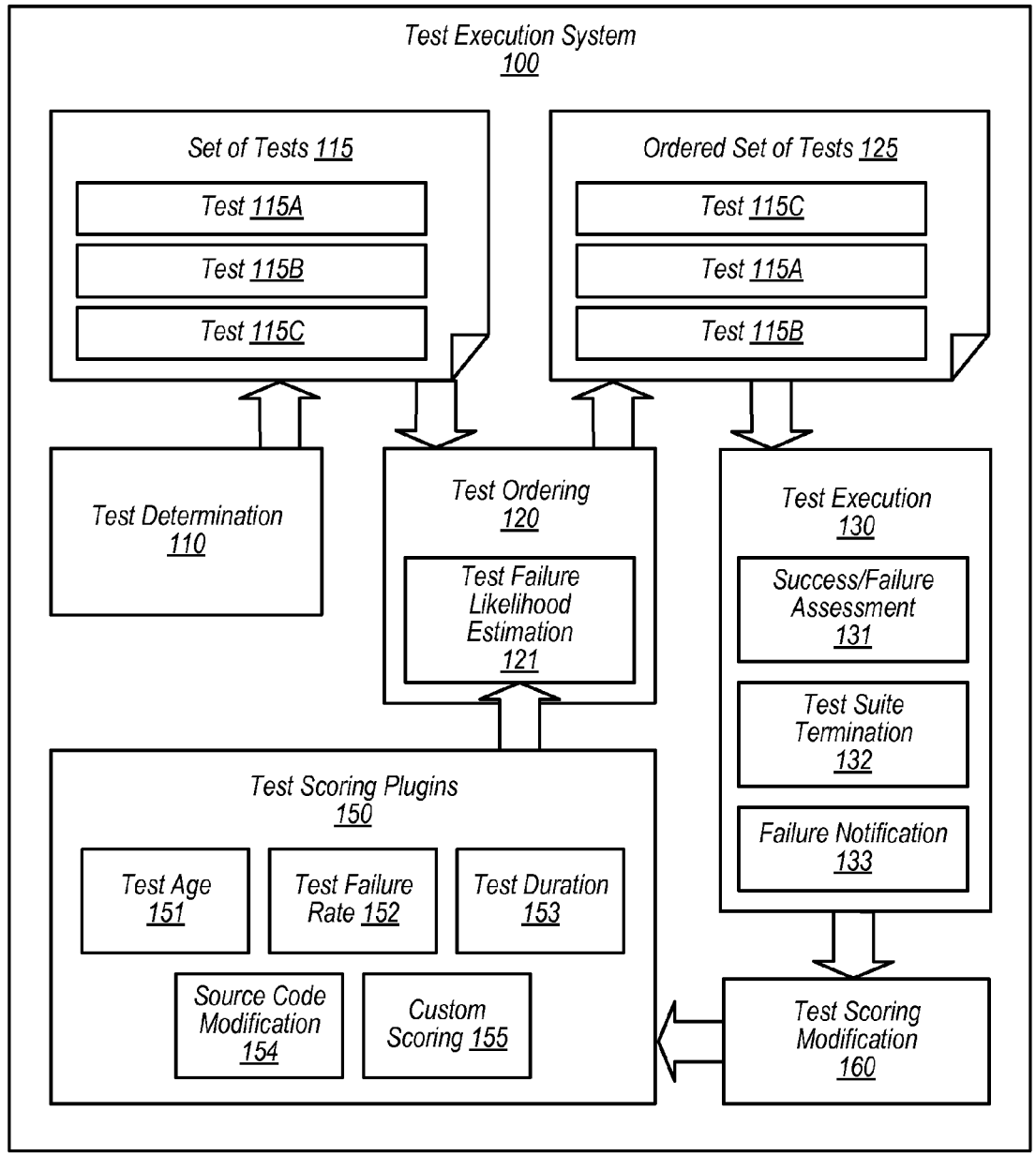
FIG. 4 illustrates further aspects of the example system environment for ordered test execution to enable faster feedback, including test scoring modification, according to one embodiment.

FIG. 4 illustrates further aspects of the example system environment for ordered test execution to enable faster feedback, including test scoring modification, according to one embodiment. In one embodiment, the test execution results may be analyzed by a test scoring modification module 160. Based on the success or failure of various sets of ordered tests and the correctness (or lack thereof) of the estimated likelihood of failure, the test scoring modification module 160 may modify the weights of one or more of the factors implemented by the test scoring plugins 150. For example, if later tests tend to fail more than earlier tests, the test scoring modification module 160 may use machine learning techniques to detect the most relevant factors in anticipating failure and modify the weights assigned to the various factors accordingly. Accordingly, the test scoring modification module 160 may represent part of a feedback loop to continually optimize the manner in which tests are ordered. Although the test scoring modification module 160 is shown in connection with the test execution system 100, the test ordering service 220 may use the test scoring modification module 160 in a similar manner.

Figure 5:
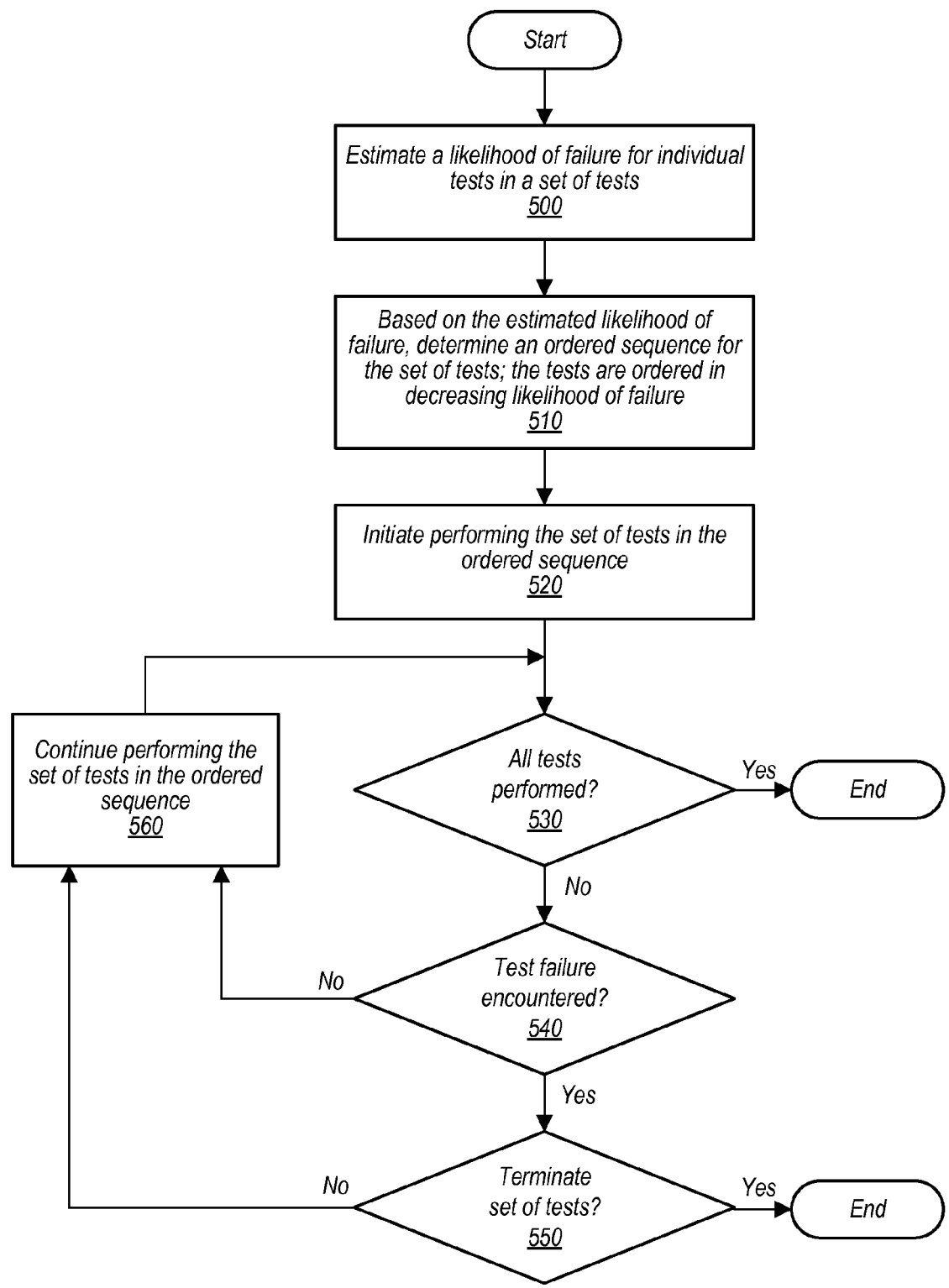
FIG. 5 is a flowchart illustrating a method for ordered test execution to enable faster feedback, according to one embodiment.

FIG. 5 is a flowchart illustrating a method for ordered test execution to enable faster feedback, according to one embodiment. As shown in 500, a likelihood of failure may be estimated for individual tests in a set of tests. As discussed above with respect to FIG. 3, the likelihood of failure for a particular test may be estimated based on a set of weighed factors. The weighted factors may include such attributes as test age, test failure rate, test duration, test source code modification, and/or custom attributes. Based on the weighted factors, each test may be assigned a score.

As shown in 510, an ordered sequence may be determined for the set of tests. The ordered sequence may be determined based on the estimated likelihood of failure for the set of tests, such that at least a portion of the tests are ordered based at least in part on decreasing likelihood of failure. In one embodiment, the tests may be sorted by their score for likelihood of failure to generate the ordered sequence.

As shown in 520, the set of tests may be initiated in the ordered sequence. In other words, one or more tests at the beginning of the ordered sequence may be attempted. To attempt one of the tests, a software product under test may be executed on one or more test hosts under particular conditions (e.g., with particular types and/or rates of input), and performance metrics may be collected for the test. The method may proceed to 530 after the initial one or more tests are attempted.

As shown in 530, it may be determined whether all the tests in the ordered sequence have been performed (or attempted). If so, then the method may end. If not, then the method may proceed to 540.

As shown in 540, it may be determined whether the most recent test(s) failed. If not, then the method may proceed to 560. As shown in 560, the set of tests may continue in the ordered sequence, e.g., by advancing to the next test(s) in the sequence and attempting to perform the test(s). After the next test(s) are attempted, the method may again proceed to the decision operation shown in 530.

If the most recent test(s) did fail, then the method may proceed to 550. As shown in 550, it may be determined whether the set of tests should be terminated. If so, then the method may end; if not, then the method may proceed to 560 to continue performing the set of tests in the ordered sequence. When testing is terminated at a particular point in the ordered sequence, any remaining tests in the ordered sequence may not be performed.

The decision to terminate the set of tests may be made by determining whether particular conditions have been met. In one embodiment, the set of tests may be terminated when a single test failure is encountered. In one embodiment, the set of tests may be terminated when a particular number or percentage of test failures are encountered, e.g., within a particular period of time. In one embodiment, the set of tests may be terminated when a particular number of test failures are encountered within a particular period of time. In one embodiment, the set of tests may be terminated when one or more particular types of test failures are encountered. In one embodiment, the set of tests may be terminated based on dependencies between one or more failed tests and one or more current tests; the dependencies may be determined using any suitable techniques, including machine learning techniques. In one embodiment, the set of tests may be automatically terminated when the conditions are met. In one embodiment, a user may be notified of one or more test failures and/or if the particular conditions are met, and the set of tests may be terminated based on user input following the notification. Because the tests are ordered in decreasing likelihood of failure, the testing process may be configured to end sooner rather than later if failures are encountered. In this manner, the development cycle may be optimized such that less developer time is spent waiting for a test suite to be completed.

Illustrative Computer System

In at least some embodiments, a computer system that implements a portion or all of one or more of the technologies described herein may include a general-purpose computer system that includes or is configured to access one or more computer-readable media. FIG. 6 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a test execution system, wherein the test execution system is configured to:
estimate a respective likelihood of failure for individual tests in a set of tests, wherein the respective likelihood of failure is estimated based at least in part on a plurality of factors, and wherein the plurality of factors comprises a respective failure history for individual ones of the set of tests;
determine an ordered sequence for the set of tests, wherein the ordered sequence is determined based at least in part on the respective likelihood of failure for the individual tests, and wherein individual tests in the ordered sequence are ordered in decreasing likelihood of failure;
initiate performing the set of tests in the ordered sequence, wherein one or more computer-executable programs are subjected to individual ones of the set of tests in the ordered sequence;
determine a failure of one or more tests in the ordered sequence, wherein the failure is determined prior to performing one or more remaining tests in the ordered sequence; and
terminate performing the set of tests in the ordered sequence based at least in part on the failure.

2. The system as recited in claim 1, wherein, in determining the ordered sequence for the set of tests, the test execution system is further configured to:
invoke a test ordering service, wherein the test ordering service is configured to store a failure history for a plurality of sets of tests;
receive the ordered sequence from the test ordering service; and
store the ordered sequence in a locally accessible cache memory.

3. The system as recited in claim 2, wherein the test execution system is further configured to:
send, to the test ordering service, data indicative of success or failure of individual ones of the set of tests that were performed in the ordered sequence.

4. The system as recited in claim 1, wherein the test execution system is further configured to:
send, to a user, a notification indicating the failure, wherein the notification is sent prior to performing the one or more remaining tests in the ordered sequence.

5. A computer-implemented method, comprising:
estimating a respective likelihood of failure for individual tests in a set of tests based at least in part on one or more of relative newness of the test, failure history of the test, respective age of test outcome failures, total number of failure outcomes of the test, percentage of failures of the test over a determined period of time, estimated time duration to completion of the test, or age of modification of source code of the test;
determining an ordered sequence for the set of tests, wherein the ordered sequence is determined based at least in part on the respective likelihood of failure for the individual tests, and wherein individual tests in the ordered sequence are ordered in likelihood of failure;
initiating performing the set of tests in the ordered sequence, wherein one or more computer-executable programs are subjected to individual ones of the set of tests in the ordered sequence; and
determining a failure of one or more tests in the ordered sequence, wherein the failure is determined prior to performing one or more remaining tests in the ordered sequence.

6. The method as recited in claim 5, further comprising:
terminating performing the set of tests in the ordered sequence based at least in part on the failure.

7. The method as recited in claim 5, wherein determining the ordered sequence for the set of tests further comprises:
invoking a test ordering service, wherein the test ordering service is configured to store a failure history for a plurality of sets of tests;
receiving the ordered sequence from the test ordering service; and
storing the ordered sequence in a locally accessible cache memory.

8. The method as recited in claim 7, further comprising:
sending, to the test ordering service, data indicative of success or failure of individual ones of the set of tests that were performed in the ordered sequence.

9. The method as recited in claim 5, further comprising:
sending, to a user, a notification indicating the failure, wherein the notification is sent prior to performing the one or more remaining tests in the ordered sequence.

10. The method as recited in claim 5, wherein the respective likelihood of failure is estimated based at least in part on a plurality of factors, wherein individual ones of the factors are assigned respective weights.

11. The method as recited in claim 10, wherein the plurality of factors comprises a respective failure history for individual ones of the set of tests, wherein one or more individual failures in the respective failure history are weighted based at least in part on age.

12. The method as recited in claim 10, wherein the plurality of factors comprises a respective test age for individual ones of the set of tests.

13. The method as recited in claim 10, wherein the plurality of factors comprises a respective test duration for individual ones of the set of tests.

14. The method as recited in claim 10, wherein one or more of the respective weights are modified based at least in part on success or failure of individual ones of the set of tests that were performed in the ordered sequence.

15. A computer-readable storage medium storing program instructions computer-executable to perform:

estimating a respective likelihood of failure for individual tests in a set of tests based at least in part on one or more of relative newness of the test, failure history of the test, age of test outcome failures, total number of failure outcomes, percentage of failures over a determined period of time, estimated time duration to completion of the test, or age of modification of source code of the test;

determining an ordered sequence for the set of tests, wherein the ordered sequence is determined based at least in part on the respective likelihood of failure for the individual tests, and wherein individual tests in the ordered sequence are ordered in decreasing likelihood of failure;

initiating performing the set of tests in the ordered sequence, wherein one or more computer-executable programs are subjected to individual ones of the set of tests in the ordered sequence;

determining a failure of one or more tests in the ordered sequence, wherein the failure is determined prior to performing one or more remaining tests in the ordered sequence; and terminating performing the set of tests in the ordered sequence based at least in part on the failure.

16. The computer-readable storage medium as recited in claim 15, wherein the program instructions are further computer-executable to perform:

invoking a test ordering service, wherein the test ordering service is configured to store a failure history for a plurality of sets of tests;

receiving the ordered sequence from the test ordering service; and storing the ordered sequence in a locally accessible cache memory.

17. The computer-readable storage medium as recited in claim 16, wherein the program instructions are further computer-executable to perform:

sending, to the test ordering service, data indicative of success or failure of individual ones of the set of tests that were performed in the ordered sequence.

18. The computer-readable storage medium as recited in claim 15, wherein the program instructions are further computer-executable to perform:

sending, to a user, a notification indicating the failure, wherein the notification is sent prior to performing the one or more remaining tests in the ordered sequence.

19. The computer-readable storage medium as recited in claim 15, wherein the respective likelihood of failure is estimated based at least in part on a plurality of factors, wherein individual ones of the factors are assigned respective weights.

20. The computer-readable storage medium as recited in claim 19, wherein the plurality of factors comprises a respective failure history for individual ones of the set of tests, wherein one or more individual failures in the respective failure history are weighted based at least in part on age.

* * * * *